(12) United States Patent
Demos

(10) Patent No.: US 10,297,008 B2
(45) Date of Patent: May 21, 2019

(54) METHOD AND SYSTEM FOR IMPROVING COMPRESSED IMAGE CHROMA INFORMATION

(75) Inventor: Gary A. Demos, Culver City, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 1579 days.

(21) Appl. No.: 13/325,695

(22) Filed: Dec. 14, 2011

(65) Prior Publication Data

US 2012/0087408 A1 Apr. 12, 2012

Related U.S. Application Data

(60) Continuation of application No. 13/197,281, filed on Aug. 3, 2011, now Pat. No. 8,737,466, which is a division of application No. 12/913,045, filed on Oct. 27, 2010, which is a division of application No. 12/176,267, filed on Jul. 18, 2008, now Pat. No. 7,961,784, which is a division of application No. 09/905,039, filed on Jul. 12, 2001, now abandoned.

(51) Int. Cl.
| | | |
|---|---|---|
| H04N 7/12 | (2006.01) | |
| G06T 3/40 | (2006.01) | |
| H04N 19/124 | (2014.01) | |
| G06T 9/00 | (2006.01) | |
| H04N 19/61 | (2014.01) | |
| H04N 19/126 | (2014.01) | |
| H04N 19/186 | (2014.01) | |

(52) U.S. Cl.
CPC ............ *G06T 3/4015* (2013.01); *G06T 9/007* (2013.01); *H04N 7/12* (2013.01); *H04N 19/124* (2014.11); *H04N 19/126* (2014.11); *H04N 19/186* (2014.11); *H04N 19/61* (2014.11)

(58) Field of Classification Search
CPC ..................................................... H04N 19/124
USPC ............. 375/240.01, 240.03, 240.25, 240.26
IPC ......................................................... H04N 7/12
See application file for complete search history.

(56) References Cited

U.S. PATENT DOCUMENTS

| | | | |
|---|---|---|---|
| 4,654,696 A | 3/1987 | Dayton et al. | |
| 4,800,375 A | 1/1989 | Silverstein et al. | |
| 4,903,317 A | 2/1990 | Nishihara et al. | |
| 5,073,820 A | 12/1991 | Nakagawa et al. | |
| 5,132,783 A | 7/1992 | Hieda | |

(Continued)

FOREIGN PATENT DOCUMENTS

| | | |
|---|---|---|
| CA | 2127151 A1 | 3/1995 |
| DE | 19714886 A1 | 11/1997 |

(Continued)

OTHER PUBLICATIONS

Office Action issued in U.S. Appl. No. 09/905,039 on Sep. 2, 2004, 5 pages.

(Continued)

*Primary Examiner* — Young Lee

(57) ABSTRACT

Methods, systems, and computer programs for improving compressed image chroma information. In one aspect of the invention, a resolution for a red color component of a color video image is used that is higher than the resolution for a blue color component of the color video image. Another aspect includes utilizing a lower or higher value of a quantization parameter (QP) for one or more chroma channels as compared to the luminance channel. Another aspect is use of a logarithmic representation of a video image to benefit image coding. Another aspect uses more than two chroma channels to represent a video image.

21 Claims, 4 Drawing Sheets

(56) References Cited

U.S. PATENT DOCUMENTS

| | | |
|---|---|---|
| 5,189,530 A | 2/1993 | Fujii |
| 5,231,484 A | 7/1993 | Gonzales et al. |
| 5,294,974 A | 3/1994 | Naimpally et al. |
| 5,333,212 A | 7/1994 | Ligtenberg |
| 5,374,958 A | 12/1994 | Yanagihara |
| 5,408,270 A | 4/1995 | Lim |
| 5,426,463 A | 6/1995 | Reininger et al. |
| 5,438,374 A | 8/1995 | Yan |
| 5,440,344 A | 8/1995 | Asamura et al. |
| 5,442,407 A | 8/1995 | Iu |
| 5,446,498 A | 8/1995 | Boon |
| 5,465,119 A | 11/1995 | Demos |
| 5,475,435 A | 12/1995 | Yonemitsu et al. |
| 5,489,944 A | 2/1996 | Jo |
| 5,555,030 A | 9/1996 | Takamoto et al. |
| 5,661,524 A | 8/1997 | Murdock et al. |
| 5,668,600 A | 9/1997 | Lee |
| 5,684,544 A | 11/1997 | Astle |
| 5,691,777 A | 11/1997 | Kassatly |
| 5,737,032 A | 4/1998 | Stenzel et al. |
| 5,742,343 A | 4/1998 | Haskell et al. |
| 5,748,903 A | 5/1998 | Agarwal |
| 5,812,194 A | 9/1998 | Wilkinson |
| 5,825,421 A | 10/1998 | Tan |
| 5,825,680 A | 10/1998 | Wheeler et al. |
| 5,835,498 A | 11/1998 | Kim et al. |
| 5,852,565 A | 12/1998 | Demos |
| 5,877,754 A | 3/1999 | Keith et al. |
| 5,914,749 A | 6/1999 | Bawolek et al. |
| 5,920,353 A | 7/1999 | Diaz et al. |
| 5,930,386 A | 7/1999 | Saito |
| 5,933,360 A | 8/1999 | Larson |
| 5,988,863 A | 11/1999 | Demos |
| 6,031,937 A | 2/2000 | Graffagnino |
| 6,069,914 A | 5/2000 | Cox |
| 6,115,421 A | 9/2000 | Katta et al. |
| 6,163,574 A | 12/2000 | Yagasaki |
| 6,172,768 B1 | 1/2001 | Yamada et al. |
| 6,215,824 B1 | 4/2001 | Assuncao |
| 6,236,727 B1 | 5/2001 | Ciacelli et al. |
| 6,268,886 B1 | 7/2001 | Choi |
| 6,301,304 B1 | 10/2001 | Jing et al. |
| 6,327,602 B1 | 12/2001 | Kim |
| 6,332,194 B1 | 12/2001 | Bloom et al. |
| 6,430,222 B1 | 8/2002 | Okada |
| 6,434,196 B1 | 8/2002 | Sethuraman et al. |
| 6,442,203 B1 | 8/2002 | Demos |
| 6,507,615 B1 | 1/2003 | Tsujii et al. |
| 6,535,251 B1 | 3/2003 | Ribas-Corbera |
| 6,629,104 B1 | 9/2003 | Parulski et al. |
| 6,650,708 B1 | 11/2003 | Ohgose |
| 6,654,417 B1 | 11/2003 | Hui |
| 6,654,420 B1 | 11/2003 | Snook |
| 6,728,317 B1 | 4/2004 | Demos |
| 6,816,552 B2 | 11/2004 | Demos |
| 6,957,350 B1 | 10/2005 | Demos |
| 7,113,152 B2 | 9/2006 | Ben-David et al. |
| 7,961,784 B2 | 6/2011 | Demos |
| 8,737,466 B2 | 5/2014 | Demos |
| 2001/0028725 A1 | 10/2001 | Nakagawa et al. |
| 2002/0154693 A1 | 10/2002 | Demos et al. |
| 2002/0186766 A1 | 12/2002 | Adelaide |
| 2003/0112863 A1 | 6/2003 | Demos |
| 2003/0112871 A1 | 6/2003 | Demos |
| 2003/0112873 A1 | 6/2003 | Demos |
| 2004/0005004 A1 | 1/2004 | Demos |
| 2005/0254649 A1 | 11/2005 | Demos |
| 2011/0038411 A1 | 2/2011 | Demos |
| 2011/0286517 A1 | 11/2011 | Demos |
| 2011/0286518 A1 | 11/2011 | Demos |
| 2011/0286519 A1 | 11/2011 | Demos |
| 2012/0033729 A1 | 2/2012 | Demos |
| 2012/0087409 A1 | 4/2012 | Demos |

FOREIGN PATENT DOCUMENTS

| | | |
|---|---|---|
| EP | 511778 A2 | 11/1992 |
| EP | 531041 A1 | 3/1993 |
| EP | 534350 A2 | 3/1993 |
| EP | 0595562 | 5/1994 |
| EP | 634871 A2 | 1/1995 |
| EP | 1369820 A2 | 12/2003 |
| GB | 2266635 | 3/1993 |
| GB | 2266635 A | 11/1993 |
| JP | 62264784 A | 11/1987 |
| JP | 62283776 A | 12/1987 |
| JP | 03092888 A | 4/1991 |
| JP | 04311195 A | 11/1992 |
| JP | 04323960 A | 11/1992 |
| JP | 6165150 A | 6/1994 |
| JP | 6350995 A | 12/1994 |
| JP | 7170516 A | 7/1995 |
| JP | 10004497 A | 1/1998 |
| JP | 11-18089 | 1/1999 |
| JP | 1188879 A | 3/1999 |
| JP | 11239351 A | 8/1999 |
| JP | 2001008209 A | 1/2001 |
| JP | 2001045476 A | 2/2001 |
| JP | 2001086356 A | 3/2001 |
| JP | 2001177731 A | 6/2001 |
| JP | 2001252088 A | 9/2001 |
| WO | WO9504433 A1 | 2/1995 |
| WO | WO 1995/035628 | 12/1995 |
| WO | WO9728507 A1 | 8/1997 |
| WO | WO 1998/027736 | 6/1998 |
| WO | WO 1998/036573 | 8/1998 |
| WO | WO9920040 A1 | 4/1999 |
| WO | WO03071119 A2 | 1/2003 |
| WO | WO03041041 A2 | 5/2003 |
| WO | WO2004004310 A2 | 1/2004 |

OTHER PUBLICATIONS

Office Action issued in U.S. Appl. No. 09/905,039 on Dec. 23, 2004, 7 pages.

Office Action issued in U.S. Appl. No. 09/905,039 on Apr. 8, 2005, 8 pages.

Office Action issued in U.S. Appl. No. 09/905,039 on Feb. 16, 2006, 6 pages.

Office Action issued in U.S. Appl. No. 09/905,039 on Aug. 8, 2007, 11 pages (Examiner's Answer to Appeal Brief).

Office Action issued in U.S. Appl. No. 09/905,039 on Apr. 23, 2008, 10 pages.

Office Action issued in U.S. Appl. No. 12/176,267 on Aug. 24, 2009, 14 pages.

Office Action issued in U.S. Appl. No. 12/176,267 on Feb. 2, 2010, 7 pages.

Office Action issued in U.S. Appl. No. 12/176,267 on May 19, 2010, 10 pages.

Office Action issued in U.S. Appl. No. 12/176,267 on Sep. 27, 2010, 10 pages.

Office Action issued in U.S. Appl. No. 12/176,267 on Dec. 10, 2010, 9 pages (Restriction Requirement).

Office Action issued in U.S. Appl. No. 12/176,267 on Feb. 23, 2011, 7 pages.

Patent Abstracts of Japan, vol. 1995, No. 03 (Apr. 28, 2005) re: JP 06350995.

PCT International Search Report issued in PCT/US02/22205 on Jan. 28, 2003, 7 pages.

PCT Written Opinion issued in PCT/US02/22205 on Apr. 2, 2003, 7 pages.

PCT International Preliminary Examination Report issued in PCT/US02/22205 on Mar. 2, 2004, 7 pages.

Pinkerton, Janet, "Digital video stymied by content protection," Dealscope Consumer Electronics Marketplace, Philadelphia, Jan. 1999, vol. 4, issue 1, p. 32.

Puri et al., "Temporal Resolution Scalable Video Coding," Image Processing. 1994 International Conference, IEEE, pp. 947-951 (1994).

(56) References Cited

OTHER PUBLICATIONS

Singapore Office Action, Application Serial No. 200601486-4, dated Aug. 17, 2006, 9 pages.
Singapore Office Action, Application Serial No. 200601486-4, dated Jul. 9, 2007, 7 pages.
Singapore Office Action issued in 200601486-4 on May 22, 2008, 6 pages.
Singapore Office Action, Search and Examination Report issued on Dec. 2, 2009 in Singapore Patent Application No. 200805819-0.
Vincent, A., et al., "Spatial Prediction in Scalable Video Coding," International Broadcasting Convention, IEEE Conference Publication No. 413, RAI International Congress and Exhibition Centre, Amsterdam, The Netherlands, Sep. 14-18, 1995, pp. 244-249.
Wyszecki and Stiles, "Color Science: Concepts and Methods, Quantitative Data and Formulae," John Wiley and Sons, 2nd Edition, p. 485-489 (1982).
EPO Office Action for Application No. 10 007 124.0-2223 dated Aug. 18, 2011, 4 pages.
EPO Office Action for Application No. 10 007 124.0-2223 dated Nov. 30, 2011, 4 pages.
Japanese Office Action and translation for Application No. 2008-206699 dated May 17, 2011, 5 pages.
Japanese Notification of Reason(s) for Refusal and translation for Application No. 2008-206699 dated Dec. 27, 2011, 4 pages.
U.S. Non-Final Office Action for U.S. Appl. No. 13/272,316 dated Jan. 10, 2012, 28 pages.
Aravind, R. et al., "Packet Loss Resilience of MPEG-2 Scalable Video Coding Algorithms," IEEE Transactions on Circuits and Systems for Video Technology 6(5): 426-435 (Oct. 1996).
Australian Examination Report, Application Serial No. 2002316676 dated Oct. 4, 2006, 1 page.
Australian Notice of Acceptance of Application, Application Serial No. 2002316676 dated May 9, 2007, 16 pages.
Australian Deed of Letters Patent and the published specification for the granted patent for Australian Patent No. AU 2002316676 B2; Granted Sep. 6, 2007, 41 pages.
Australian Examination Report, Application Serial No. 2007203288, dated Aug. 27, 2007, 4 pages.
Australian Examination Report, Application Serial No. 2007203288, dated Sep. 20, 2007, 2 pages.
Australian Notice of Acceptance, Application Serial No. 2007203288, dated Nov. 19, 2007, 16 pages.
Australian Deed of Letters Patent and the published specification for the granted patent for Australian Patent No. 200703288; Granted Mar. 13, 2008, 47 pages.
Australian Examination Report, Application Serial No. 2007231887 dated Sep. 17, 2008, 2 pages.
Australian Notice of Acceptance of Application, Application Serial No. 2007231887 dated Oct. 2, 2008, 12 pages.
Australian Deed of Letters Patent and the published specification for the granted patent for Australian Patent No. 2007231887; Granted Jan. 29, 2009, 44 pages.
Bloomfield, L., "Copy Protection—déjà vu," Broadcast Engineering 40(11): 14-15 (Oct. 1998).
Canadian Office Action issued in 2452506 on Apr. 19, 2006, 3 pages.
Canadian Notice of Allowance issued in 2452506, dated Dec. 6, 2007, 2 pages.
Canadian Office Action issued in 2,621,107 on Nov. 3, 2009, 3 pages.
Canadian Office Action issued in 2,621,107 on Apr. 21, 2009 3 pages.
Canadian Office Action, Application Serial No. 2439727, dated Aug. 15, 2007, 3 pages.
Canadian Patent Grant, Canadian Application No. 2,452,506, dated Apr. 8, 2008, 3 pages.
Chinese Office Action issued in 02813792.2 on Mar. 11, 2005, 11 pages.
Chinese Grant Certificate and Patent No. ZL 02813792.2, dated Apr. 5, 2006, 27 pages.

Demos, G., A Comparison of Hierarchical High Definition Imagry Coding Schema,: DemoGraFX Corp. IEEE, pp. 68-75 (1992).
Demos, G., "An Example Representation for Image Color and Dynamic Range Which is Scalable, Interoperable, and Extensible," 135th Technical Conference, Society of Motion Picture and Televison Engineers, Oct. 1993, Los Angeles, CA, 22 pages.
Demos, G., "Temporal and Resolution Layering in Advanced Television," SPIE 2663: 52-68 (Nov. 1995).
Demos, G., "The Use of Logarithmic and Density Units for Pixels," SMPTE Journal 100(10): Oct. 1990, pp. 805-816 (1990).
English language abstract for JP 06165150, published Jun. 10, 1994, entitled: "Dynamic Picture Coding/Decoding Device", 1 page.
European Search Report, Application Serial No. 02747000.4, dated May 13, 2008, 3 pages.
European Search Report issued on Mar. 8, 2010, in EP 08075656.2, 7 pages.
European Search Report (Partial) issued in 08075656.2 on Dec. 10, 2009, 4 pages.
European Search Report and Opinion issued on Sep. 1, 2010 in EP 10007124.0, 4 pages.
H.261, ITU-T Telecommunication Standardization Sector of ITU, Line Transmission of non-telephone signals. Video Codec for Audiovisual Services at p X64 kbits, (03/93), 28 pages.
H.263, ITU-T Telecommunication Standardization Sector of ITU, Series H: Audiovisual and Multimedia Systems, Infrastructure of audiovisual services—coding of moving video. Video coding for low bit rate communication, (Jan. 2005), 226 pages.
H.263, Appendix III, ITU-T Telecommunication Standardization Sector of ITU, Series H: Audiovisual and Multimedia Systems, Infrastructure of audiovisual services—coding of moving video. Video coding for low bit rate communication, Appendix III: Examples for H.263 encoder/decoder implementations, (Jun. 2001), 48 pages.
IEEE Standard Specification for the Implementations of 8×8 Inverse Discrete Cosine Transforms, IEEE Std 1180-1990, The Institute of Electrical and Electronics Engineers, Inc.; United States of America, 12 pages (1991).
Indian Office Action issued in 00056/DELNP/2004 on Apr. 8, 2011, 2 pages.
ISO/IEC 14496-2 International Standard, Information technology—coding of audio-visual objects—Part 2: visual, 2nd Edition, Dec. 1, 2001, 536 pages.
ISO/IEC 14496-2 International Standard, Information technology—coding of audio-visual objects—Part 2: visual, 2nd Edition, Amendment 2: Streaming video profile, Feb. 1, 2002, 64 pages.
ISO/IEC JTC 1, "Coding of audio-visual objects—Part 2: Visual," ISO/IEC 14496-2 (MPEG-4 Part 2), Dec. 1999, 348 pages.
Japanese Office Action, Application Serial No. 2003-512824, dated Mar. 18, 2008, 4 pages.
Japanese Office Action with translation, Application No. 2003-512824, dated Oct. 15, 2008, 4 pages.
Korean Office Action issued in 10-2004-7000367 on Jan. 20, 2009, and English translation (8 pages).
Lim, Jae S., "A migration path to a better digital television system," SMPTE Journal 103(1): 2-6 (Jan. 1, 1994).
Mexican Patent No. 277175 issued on Jul. 9, 2010, 41 pages.
Notice of Allowance issued in U.S. Appl. No. 12/176,267 on Apr. 29, 2011, 7 pages.
Office Action issued in U.S. Appl. No. 09/798,346, dated Apr. 3, 2006, 12 pages.
Office Action issued in U.S. Appl. No. 09/798,346, dated Aug. 23, 2007, 8 pages.
Office Action issued in U.S. Appl. No. 09/798,346, dated Nov. 27, 2006, 7 pages.
Office Action issued in U.S. Appl. No. 09/905,035 on May 23, 2003, 4 pages (Restriction Requirement).
Office Action issued in U.S. Appl. No. 09/905,039 on Jul. 17, 2003, 9 pages.
Office Action issued in U.S. Appl. No. 09/905,039 on Jan. 15, 2004, 6 pages.
Office Action issued in U.S. Appl. No. 09/905,039 on Apr. 5, 2004, 7 pages.
Bjontegaard et al., "Definition of New Coding Elements from Telenor," 10. VCEG Meeting; May 16, 2000-May 19, 2000; Osaka,

(56) References Cited

OTHER PUBLICATIONS

JP; (Video Codingexperts Group of ITU-T SG.16), No. q15j28, May 9, 2000, EP030003057, ISSN: 0000-0466.
Bjontegaard et al., "H.26L Test Model Long Term No. 4 (TML-4) draft)", ITU-IT Study Group 16, Video Coding Experts Group Question 15, SCEG Meeting, May 16-18, 2000, Osaka, Japan, q15j72d).doc Jun. 16, 2000, Section 3.1, Section 4.3.3, Retrieved from the Internet <URL: http://wftp3.itu.int/av-arch/video-site/0005_Osa/q15j72d0.doc>, 30 pages.
Bjontegaard et al., "Use of Higher QP for Chroma AC Coefficients," 11. VCEG Meeting; Aug. 22, 2000-Aug. 25, 2000; Portland, Oregon, US;(Video Coding Experts Group of ITU-T SG.16), No. q15k29, Aug. 16, 2000 (Aug. 16, 2000), XP030003122, ISSN: 0000-0463, 2 pages.
Communication Pursuant to Article 94(3) EPC issued in EP 12160436.7-2223 on Nov. 9, 2012, 8 pages.
Communication Pursuant to Article 94(3) EPC issued in EP 12160438.3-2223 on Oct. 9, 2012, 8 pages.
Communication Pursuant to Article 94(3) EPC issued in EP 12161238.6-2223 on Nov. 16, 2012, 8 pages.
Communication Pursuant to Article 94(3) EPC issued in EP 12161242.8-2223 on Nov. 16, 2012, 8 pages.
Communication Pursuant to Article 94(3) EPC issued in EP 12161246.9-2223 on Oct. 9, 2012, 8 pages.
Communication Pursuant to Article 94(3) EPC issued in EP 12161251.9-2223 on Oct. 9, 2012, 8 pages.
Communication Pursuant to Article 94(3) EPC issued in Ep 12161254.3-2223 on Nov. 20, 2012, 8 pages.
D10 q15kT0.doc—announcement of 11th meeting—Portland, Oregon; Sullivan, "Announcement of the Eleventh Meeting of the Experts Group for ITU-T Q.15/SG16—Advanced Video Coding Portland, Oregon, USA, Aug. 22-25, 2000" 12 pages, Aug. 8, 2000.
D11 q15kT1r1—meeting plan; Eleventh Meeting of ITU-T Q.15/SG16 Advanced Video Coding Experts Group, Aug. 22-24, 2000 Meeting Plan (See Also Figure 1), Aug. 23, 2000, 4 pages.
D12 Meeting Report of the 11th meeting, Portland Oregon; ITU—Telecommunications Standardization Sector Study Group 6, Video Coding Experts Group (Question 15), Document Q15-K-60d1, Nov. 9, 2000, 39 pages.
D13 web page of ITU; wftp3.itu.int—/av-arch/ [online] Feb. 23, 2013 [retrieved Mar. 15, 2013]. Retrieved from the Internet: <URL: http://wftp3.itu.int/av-arch/>, 1 page.
D14 Lindbergh, "Transfer of standards.pictel.com to ITU" email dated Apr. 4, 2003, [retrieved Mar. 15, 2013]. Retrieved from the Internet: <URL: http://wftp3.itu.int/av-arch/>, 3 pages.
D15 Richardson, "H.264 and MPEG-4 Video Compression," Chapter 4: The MPEG-4 and H.264 Standards, pp. 85-98, Oct. 17, 2003.
D16 Letter dated Sep. 14, 2009 from Hubert Plugge of the EPO to Mr Franz Zinkler concerning EP application 08018793.3, 2 pages.
D8 web page showing all VCEG meeting document folders from Feb. 2002; wftp3.itu.int - /av-arch/video-site/ [online] [retrieved on Mar. 15, 2013]. Retrieved from the Internet <URL: http://wftp3.itu.int/av-arch/video-site/>, 2 pages.
D9 website of VCEG meeting documents for the Portland, Oregon meeting; wftp3.itu.int - /av-arch/video-site/0008_Por/ [online] Mar. 13, 2001 [retrieved on Mar. 1, 2013]. Retrieved from the Internet <URL: http://wftp3.itu.int/av-arch/video-site/0008_Por/>, 2 pages.
EPO "Summons to attend oral proceedings pursuant to Rule 115(1) EPC" for European Application No. 12160431.8 dated May 17, 2013, 88 pages.
EPO "Summons to attend oral proceedings pursuant to Rule 115(1) EPC" for European Application No. 12160433.4 dated May 17, 2013, 88 pages.
EPO "Summons to attend oral proceedings pursuant to Rule 115(1) EPC" for European Application No. 12160436.7 dated May 17, 2013, 87 pages.
EPO "Summons to attend oral proceedings pursuant to Rule 115(1) EPC" for European Application No. 12160438.3 dated May 17, 2013, 87 pages.
EPO "Summons to attend oral proceedings pursuant to Rule 115(1) EPC" for European Application No. 12161238.6 dated May 17, 2013, 88 pages.
EPO "Summons to attend oral proceedings pursuant to Rule 115(1) EPC" for European Application No. 12161242.8 dated May 17, 2013, 87 pages.
EPO "Summons to attend oral proceedings pursuant to Rule 115(1) EPC" for European Application No. 12161246.9 dated May 17, 2013, 87 pages.
EPO "Summons to attend oral proceedings pursuant to Rule 115(1) EPC" for European Application No. 12161251.9 dated May 17, 2013, 87 pages.
EPO "Summons to attend oral proceedings pursuant to Rule 115(1) EPC" for European Application No. 12161254.3 dated May 17, 2013, 88 pages.
EPO Office Action for Application No. 12160431.8 dated Aug. 21, 2012, 8 pages.
European Search Report for EP App. No. 13180372.8 dated Aug. 7, 2014, 12 pages.
European Search Report issued in 12160431.8-2223 on Jul. 27, 2012, 4 pages.
European Search Report issued in 12160433.4-2223 on Jul. 27, 2012, 4 pages.
European Search Report issued in 12160436.7-2223 on Aug. 1, 2012, 4 pages.
European Search Report issued in 12160438.3-2223 on Aug. 1, 2012, 4 pages.
European Search Report issued in 12161238.6-2223 on Jul. 30, 2012, 4 pages.
European Search Report issued in 12161242.8-2223 on Jul. 30, 2012, 4 pages.
European Search Report issued in 12161246.9-2223 on Aug. 1, 2012, 4 pages.
European Search Report issued in 12161251.9-2223 on Aug. 1, 2012, 4 pages.
European Search Report issued in 12161254.3-2223 on Jul. 30, 2012, 4 pages.
H.262. ITU-T Telecommunication Standardization Sector of ITU, Transmission of Non-Telephone Signals, Information Technology—Generic Coding of Moving Pictures and Associated Audio Information: Video, p. vi and p. 5, Jul. 1995.
ISO/IEC 14496-2 International Standard, Information technology—coding of audio-visual objects-Part 2: visual, p. xvi and p. 7, dated 2001.
Japanese Office Action and translation, Application No. 2008-20669, dated Jul. 17, 2012, 4 pages.
Japanese Office Action for Application No. 2010-269367, Feb. 27, 2013 6 pages.
Minutes of the oral proceedings in EP Application No. 12160431.8, dated Feb. 10, 2014, 7 pages.
Minutes of the oral proceedings in EP Application No. 12160433.4, dated Feb. 10, 2014, 8 pages.
Minutes of the oral proceedings in EP Application No. 12160436.7, dated Feb. 7, 2014, 5 pages.
Minutes of the oral proceedings in EP Application No. 12160438.3, dated Feb. 10, 2014, 6 pages.
Minutes of the oral proceedings in EP Application No. 12161238.6, dated Feb. 7, 2014, 6 pages.
Minutes of the oral proceedings in EP Application No. 12161242.8, dated Feb. 10, 2014, 10 pages.
Minutes of the oral proceedings in EP Application No. 12161246.9, dated Feb. 10, 2014, 5 pages.
Minutes of the oral proceedings in European Application No. 12161251.9, dated Feb. 10, 2014, 5 pages.
Minutes of the oral proceedings in European Application No. 12161254.3, dated Feb. 7, 2014, 6 pages.
Office Action in European Application No. 12160431.8 dated Feb. 10, 2014, 17 pages.
Office Action in European Application No. 12160433.4 dated Feb. 10, 2014, 16 pages.
Office Action in European Application No. 12160436.7 dated Feb. 7, 2014, 15 pages.

(56) References Cited

OTHER PUBLICATIONS

Office Action in European Application No. 12160438.3, dated Feb. 10, 2014, 16 pages.
Office Action in European Application No. 12161238.6, dated Feb. 7, 2014, 17 pages.
Office Action in European Application No. 12161242.8, dated Feb. 10, 2014, 17 pages.
Office Action in European Application No. 12161246.9, dated Feb. 12, 2014, 15 pages.
Office Action in European Application No. 12161251.9, dated Feb. 10, 2014, 16 pages.
Office Action in European Application No. 12161254.3, dated Feb. 7, 2014, 15 pages.
Office Action in Japanese Application No. 2010-269367, dated Aug. 7, 2013, 8 pages [includes English translation].
Office Action in Japanese Application No. 2012-285980, dated Aug. 7, 2013, 10 pages [includes English translation].
Office Action in Japanese Application No. 2012-285984, dated Aug. 7, 2013, 10 pages [includes English translation].
Office Action in Japanese Application No. 2012-285987, dated Aug. 7, 2013, 8 pages [includes English translation].
Office Action in Japanese Application No. 2012-285993, dated Aug. 7, 2013, 8 pages [includes English translation].
Office Action in Japanese Application No. 2012-285999, dated Aug. 7, 2013, 9 pages [includes English translation].
Office Action in Japanese Application No. 2012-286002, dated Aug. 7, 2013, 11 pages [includes English translation].
Office Action in Japanese Application No. 2012-286007, dated Aug. 7, 2013, 9 pages [includes English translation].
Office Action in Japanese Application No. 2012-286013, dated Aug. 7, 2013, 8 pages [includes English translation].
Rijkse, K. et al., "Report of General Video Ad Hoc Committee," 11.LBC Meeting; Oct. 17, 1995—Oct. 20, 1995; Darmstadt; (ITU Low Bitratecoding Group), No. LBC-95-251, Oct. 17, 1995, 54 pages.
Singapore Search and Examination Report for Application No. 201203639-8, dated Feb. 27, 2013, 18 pages.
Singapore Search and Examination Report for Application No. 201303747-8, dated Feb. 14, 2014, 14 pages.
Singapore Search and Examination Report for Application No. 201303748-6, dated Feb. 14, 2014, 16 pages.
U.S. Examiner's Answer for U.S. Appl. No. 12/913,045 dated Apr. 14, 2014, 6 pages.
U.S. Final Office Action for U.S. Appl. No. 12/913,045, dated Jul. 9, 2013, 8 pages.
U.S. Final Office Action for U.S. Appl. No. 13/197,211, dated Mar. 6, 2014, 6 pages.
U.S. Final Office Action for U.S. Appl. No. 13/197,211, dated Oct. 22, 2013, 5 pages.
U.S. Final Office Action for U.S. Appl. No. 13/197,248, dated Oct. 24, 2013, 7 pages.
U.S. Final Office Action for U.S. Appl. No. 13/197,281, dated Sep. 9, 2013, 5 pages.
U.S. Final Office Action for U.S. Appl. No. 13/272,316, dated Aug. 29, 2013, 7 pages.
U.S. Final Office Action for U.S. Appl. No. 13/272,316, dated Jan. 2, 2015, 8 pages.
U.S. Final Office Action for U.S. Appl. No. 13/272,316, dated May 7, 2012, 6 pages.
U.S. Final Office Action for U.S. Appl. No. 13/325,773 dated May 15, 2012, 7 pages.
U.S. Non-Final Office Action for U.S. Appl. No. 12/913,045 dated Apr. 19, 2013, 6 pages.
U.S. Non-Final Office Action for U.S. Appl. No. 13/197,248, dated Jul. 1, 2013, 6 pages.
U.S. Non-Final Office Action for U.S. Appl. No. 13/272,316 dated Mar. 29, 2012, 15 pages.
U.S. Non-Final Office Action for U.S. Appl. No. 13/272,316, dated Feb. 24, 2014, 9 pages.
U.S. Non-Final Office Action for U.S. Appl. No. 13/325,773 dated Apr. 13, 2012, 38 pages.
Decision on Appeal for United States Application No. 13/325,733, Jun. 16, 2015, 6 pages.
Record of Oral Hearing for United States U.S. Appl. No. 13/325,773, Jun. 23, 2015, 7 pages.
U.S. Final Office Action for U.S. Appl. No. 13/272,316, dated Jun. 3, 2014, 10 pages.
U.S. Non-Final Office Action for U.S. Appl. No. 13/272,316 dated Jun. 10, 2015, 10 pages.
Notice of Allowance for U.S. Appl. No. 13/325,773, dated Sep. 8, 2015, 5 pages.
Kasson et al., "An analysis of selected computer interchange color spaces," ACM, (TOG), US, 11(4): 373-405, Oct. 1992, 33 pages.
Singapore Office Action, Application No. 2013037478, dated Jun. 7, 2016, 7 pages.
U.S. Examiner's Answer to Appeal Brief for U.S. Appl. No. 13/197,211, dated Sep. 9, 2014, 8 pages.
U.S. Examiner's Answer to Appeal Brief for U.S. Appl. No. 13/197,248, dated Jun. 25, 2014, 12 pages.
U.S. Final Office Action for U.S. Appl. No. 13/272,316, dated Sep. 23, 2015, 8 pages.
U.S. Final Office Action for U.S. Appl. No. 13/325,773, dated Mar. 10, 2016, 8 pages.
U.S. Final Office Action for U.S. Appl. No. 14/827,731, dated Mar. 10, 2016, 10 pages.
U.S. Final Office Action for U.S. Appl. No. 14/827,830, dated Feb. 26, 2016, 9 pages.
U.S. Non-Final Office Action for U.S. Appl. No. 13/325,773 dated Nov. 24, 2015, 8 pages.
U.S. Non-Final Office Action for U.S. Appl. No. 14/827,731, dated Nov. 13, 2015, 9 pages.
U.S. Non-Final Office Action for U.S. Appl. No. 14/827,830 dated Oct. 26, 2015, 9 pages.
European Communication pursuant to Article 94(3) EPC in European Application No. 13180372.8, dated Aug. 2, 2016, 20 pages.
Written submissions of the oral arguments in India Patent Application No. 56/DELNP/2004, dated Aug. 1, 2017, 25 pages.

METHOD AND SYSTEM FOR IMPROVING COMPRESSED IMAGE CHROMA INFORMATION

CROSS REFERENCE TO RELATED APPLICATIONS

This application is a continuation of, and claims the benefit of priority to, U.S. patent application Ser. No. 13/197,281, filed Aug. 3, 2011, which is a divisional of and claims priority to U.S. application Ser. No. 12/913,045, filed on Oct. 27, 2010, which is a divisional of and claims priority to U.S. application Ser. No. 12/176,267, filed on Jul. 18, 2008, now U.S. Pat. No. 7,961,784, which is a divisional of and claims priority to U.S. application Ser. No. 09/905,039, filed on Jul. 12, 2001, now abandoned. The disclosures of these applications are incorporated by reference in their entirety.

TECHNICAL FIELD

This invention relates to video compression, and more particularly to methods, systems, and computer programs for improving compressed image chroma information in MPEG-like video compression systems.

BACKGROUND

MPEG Background

MPEG-2 and MPEG-4 are international video compression standards defining a video syntax that provides an efficient way to represent image sequences in the form of more compact coded data. The language of the coded bits is the "syntax." For example, a few tokens can represent an entire block of samples (e.g., 64 samples for MPEG-2). Both MPEG standards also describe a decoding (reconstruction) process where the coded bits are mapped from the compact representation into an approximation of the original format of the image sequence. For example, a flag in the coded bitstream signals whether the following bits are to be preceded with a prediction algorithm prior to being decoded with a discrete cosine transform (DCT) algorithm. The algorithms comprising the decoding process are regulated by the semantics defined by these MPEG standards. This syntax can be applied to exploit common video characteristics such as spatial redundancy, temporal redundancy, uniform motion, spatial masking, etc. In effect, these MPEG standards define a programming language as well as a data format. An MPEG decoder must be able to parse and decode an incoming data stream, but so long as the data stream complies with the corresponding MPEG syntax, a wide variety of possible data structures and compression techniques can be used (although technically this deviates from the standard since the semantics are not conformant). It is also possible to carry the needed semantics within an alternative syntax.

These MPEG standards use a variety of compression methods, including intraframe and interframe methods. In most video scenes, the background remains relatively stable while action takes place in the foreground. The background may move, but a great deal of the scene is redundant. These MPEG standards start compression by creating a reference frame called an "intra" frame or "I frame". I frames are compressed without reference to other frames and thus contain an entire frame of video information. I frames provide entry points into a data bitstream for random access, but can only be moderately compressed. Typically, the data representing I frames is placed in the bitstream every 12 to 15 frames (although it is also useful in some circumstances to use much wider spacing between I frames). Thereafter, since only a small portion of the frames that fall between the reference I frames are different from the bracketing I frames, only the image differences are captured, compressed, and stored. Two types of frames are used for such differences—predicted or P frames, and bi-directional interpolated or B frames.

P frames generally are encoded with reference to a past frame (either an I frame or a previous P frame), and, in general, are used as a reference for subsequent P frames. P frames receive a fairly high amount of compression. B frames provide the highest amount of compression but require both a past and a future reference frame in order to be encoded. Bi-directional frames are never used for reference frames in standard compression technologies.

Macroblocks are regions of image pixels. For MPEG-2, a macroblock is a 16×16 pixel grouping of four 8×8 DCT blocks, together with one motion vector for P frames, and one or two motion vectors for B frames. Macroblocks within P frames may be individually encoded using either intra-frame or inter-frame (predicted) coding. Macroblocks within B frames may be individually encoded using intra-frame coding, forward predicted coding, backward predicted coding, or both forward and backward (i.e., bi-directionally interpolated) predicted coding. A slightly different but similar structure is used in MPEG-4 video coding.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed pattern (e.g., IBBPBBPBBPBBPBB).

MPEG Color Space Representation

MPEG-1, MPEG-2, and MPEG-4 all utilize a Y, U, V color space for compression. There is a choice of luminance equation, but a typical conversion transformation between RGB (red-green-blue) to a YUV representation is expressed as:

$$Y=0.59\ G+0.29\ R+0.12\ B$$

$$U=R-Y$$

$$V=B-Y$$

The Y luminance factors for green range from 0.55 up to 0.75, depending upon the color system. The factors for red range from 0.2 to 0.3, and the factors for blue range from 0.05 to 0.15.

This transformation can be cast as a matrix transformation, which is a linear operator intended for use on linear signals. However, this simple transformation is performed in MPEG 1, 2, and 4 in the non-linear video space, yielding various artifacts and problems.

It is typical in MPEG to reduce the resolution of the U and V chroma channels to achieve higher compression. The most commonly used reduction of resolution is to use half resolution both vertically and horizontally. MPEG-2 supports full resolution chroma, as well as half resolution horizontally. However, the most commonly used MPEG-2 profiles, Main Profile at Main Level (MP @ ML) and Main Profile at High Level (MP @ HL), use half resolution horizontally and vertically. MPEG-4 versions 1 and 2 use half resolution vertically and horizontally. Note that full chroma resolution is often called 4:4:4, half chroma horizontal resolution is often called 4:2:2, and half vertical and horizontal resolution is often called 4:2:0. (It should be noted that the 4:x:x nomenclature is flawed in its meaning and derivation, but it is common practice to use it to describe the chroma resolution relationship to luminance.)

The filter which reduces the horizontal and vertical chroma resolution under the various MPEG standards is applied to non-linear video signals as transformed into the U and V color representation. When the inverse transformation is applied to recover RGB, the non-linear signals and the filters interact in such a way as to produce artifacts and problems. These problems can be generalized as "crosstalk" between the Y luminance and the U and V chroma channels, along with spatial aliasing.

Further information on linear versus non-linear representations and transformations may be found in "The Use of Logarithmic and Density Units for Pixels" by Gary Demos, presented at the October 1990 SMPTE conference, and published in the SMPTE Journal (October 1991, vol. 100, no. 10). See also "An Example Representation for Image Color and Dynamic Range which is Scalable, Interoperable, and Extensible" by Gary Demos, presented at the October 1993 SMPTE conference and published in the proceedings and preprints. These papers describe the benefits of logarithmic and linear spaces at various stages of the image compression processing pipeline, and are hereby incorporated by reference.

Chroma Sub-Sampling

The reason for reducing chroma resolution for U and V is that the human visual system is less sensitive to changes in U and V than it is to changes in luminance, Y. Since Y is mostly green, and U and V are mostly red, and blue respectively, this can also be described as a human visual sensitivity being higher for green than for red and blue. However, although U and V are treated the same in MPEG-1, MPEG-2, and MPEG-4, the human visual system is more sensitive to U (with its red component) than to V (with its blue component).

This difference in chroma sensitivity is embodied in the 1951 NTSC-2 color standard that is used for television. NTSC-2 uses a YIQ color space, where I and Q are similar to U and V (with slightly different weightings). That is, the I channel primarily represents red minus luminance and the Q channel primarily represents blue minus luminance. In NTSC-2, the luminance is given 4.5 MHz of analog bandwidth, and the I chroma channel is given 1.5 MHz of analog bandwidth. The Q channel, representing the blue-yellow axis, is given only 0.5 MHz of analog bandwidth.

Thus, the NTSC-2 television system allocates three times as much information to the I channel than it does to the Q channel, and three times as much information to the Y luminance channel than to the I channel. Therefore, the bandwidth ratio between the Y luminance channel and the Q (blue minus luminance) channel is nine. These MPEG YUV and NTSC-2 relationships are summarized in the following table:

| Ratio of Chroma Resolution to Luminance | | | | |
|---|---|---|---|---|
| Ratio | YUV 4:4:4 | YUV 4:2:2 | YUV 4:2:0 | NTSC-2 |
| Red, U, and I pixels to Y | 1:1 | 2:1 | 4:1 | 3:1 |
| Blue, V, and Q pixels to Y | 1:1 | 2:1 | 4:1 | 9:1 |

Clearly there is a greater difference in treatment between the luminance channel and the U and V channels under the MPEG standards than the luminance and I and Q channels in the NTSC-2 standard.

SUMMARY

The invention is directed to methods, systems, and computer programs for improving compressed image chroma information.

More particularly, in one aspect of the invention, a color video image may be improved by increasing the red resolution for an RGB representation (or the U resolution for a YUV representation) above the resolution used for blue (or V). Using lower resolution for the blue color component means less information needs to be compressed, such as in a motion compensated color video image compression system. This aspect of the invention includes a method, system, and computer program for compressing image chroma information of a color video image in a video image compression system by selecting a resolution for a red color component of the color video image that is higher than the resolution for a blue color component of the color video image.

Another aspect of the invention is a technique for reducing the level of chroma noise that results from any given value of the quantization parameter (QP) used during compression, thereby improving image quality. This is accomplished by utilizing a lower value of QP for the U (=R−Y) channel than for the Y channel. Similarly, the quality of the V (=B−Y) channel may also be improved by utilizing a lower QP value for the V channel than for the Y channel.

Another aspect of the invention is a technique useful when higher compression is required. In this aspect, a positive QP bias is applied to the QP value for the Y channel for use with either or both of the U and V chroma channels.

Another aspect of the invention is use of a logarithmic representation to benefit image coding. Logarithmic coding, when feasible, can improve coding efficiency for YUV color space representations of images originally represented as linear RGB pixel values. At other processing steps, a conversion to and from linear representations can be beneficial.

Another aspect of the invention is a method for improving the video characteristics of a color video image in a video compression system, including: selecting a set of image channels to represent the color video image, including a luminance channel and n chroma channels, where n is at least three; and compressing the luminance channel and the n additional chroma channels to a compressed video image.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Improved Color Coding Precision

As the quality of images improves with respect to the attributes of reduced noise, extended dynamic range, and extended color range, human sensitivity to color also increases. In particular, it has been observed that red in an RGB representation (or U in a YUV representation) often requires higher precision and clarity than is commonly used in video compression.

Unless blue is being used for processing (such as blue-screen special effects compositing or image analysis), human sensitivity to the blue-yellow chroma axis, as embodied by either blue or V, is adequately addressed by half resolution sampling horizontally and vertically. Thus, one quarter of the total number of pixels of an image provides sufficient quality for representing the blue or V chroma axis. However, unlike blue and V, one-half resolution coding of red and/or U is sometimes insufficient in quality with respect to large wide-dynamic range displays and projectors.

Thus, an image may be improved by increasing the red resolution for an RGB representation (or the U resolution for a YUV representation) above the resolution used for blue (or V). Using lower resolution for the blue color component means less information needs to be compressed, such as in a motion compensated color video image compression system.

In accordance with the invention, there are three preferred methods of maintaining increased red (or U) resolution with respect to a downfiltered blue (or V) resolution:

1) Use full resolution for red and/or U;

2) Use one-half resolution on only one chroma axis, either vertically or horizontally, for red and/or U; or 3) Use a filtered resolution between full size and one-half, such as ⅔ or ¾, on one or both chroma axes for red and/or U.

Figure 1:
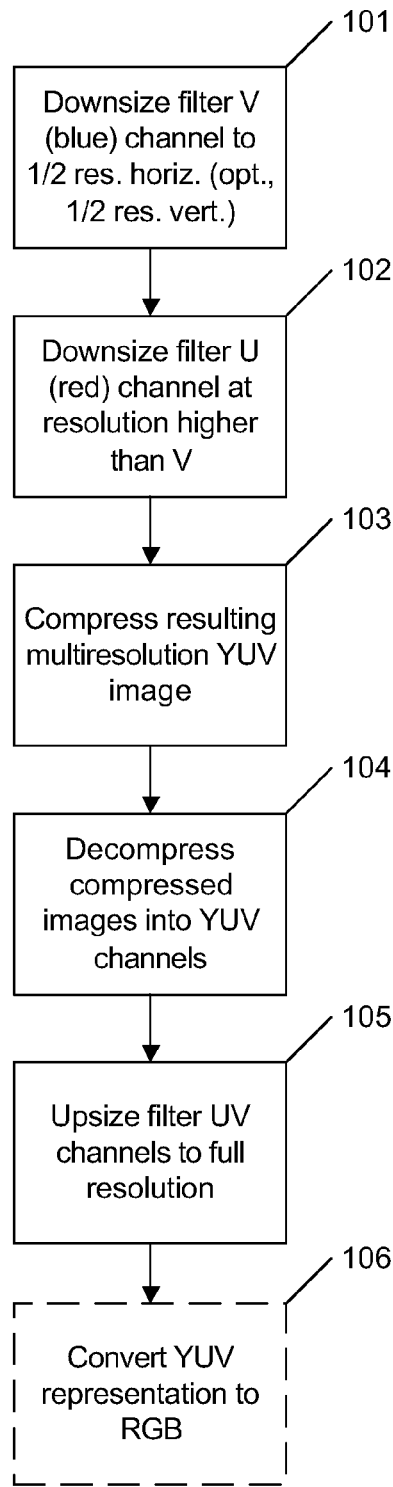
FIG. 1 is a flowchart showing an illustrative method (which may be computer implemented) for increasing the resolution for U above the resolution used for V in a YUV color space representation.

FIG. 1 is a flowchart showing an illustrative method (which may be computer implemented) utilizing higher resolution for U than the resolution used for V in a YUV color space representation (a similar method may be applied to an RGB color space representation):

Step 101: In an image compression system utilizing a YUV color space representation, downsize filter the V (=B−Y) channel of an input image to one-half resolution horizontally, and optionally to one-half resolution vertically.

Step 102: Downsize filter the U (=R−Y) channel of the image to a resolution higher than the V (=B−Y) channel, preferably being one of:

a) full resolution;

b) between one-half and full resolution horizontally, but full resolution vertically;

c) between one-half and full resolution horizontally and vertically;

d) between one-half and full resolution vertically, but full resolution horizontally.

Step 103: Compress the YUV image (having luminance Y and the downsize filtered U and V chroma information) using an MPEG-like compression system.

Step 104: Decompress the images into Y, U, and V channels (usually in a different computer).

Step 105: Convert the U and V channels to full resolution, using the appropriate resolution increase (i.e., the reciprocal of the downsize filter factor used in Step 101 above for V and Step 102 above for U).

Step 106: Optionally, convert the YUV picture to an RGB image for viewing, analysis, or further processing.

Differential QP Bias for Chroma

Co-pending U.S. patent application Ser. No. 09/798,346, entitled "High Precision Encoding and Decoding of Video Images" and assigned to the assignee of the present invention (which is hereby incorporated by reference), teaches various aspects of the use of the quantization parameter (QP) during compression. Another aspect of the present invention is a technique for reducing the level of chroma noise that results from any given value of the quantization parameter (QP) used during compression, thereby improving image quality. This is accomplished by utilizing a lower value of QP for the U (=R−Y) channel than for the Y channel. Similarly, the quality of V (=B−Y) may also be improved by utilizing a lower QP value for the V channel than for the Y channel.

A simple method of implementing a reduced chroma QP value is to subtract a constant value from the QP value used for the Y (luminance) channel. Alternatively, a separate constant value (lower than the QP value for Y) might be used for each of U and V. For example, "2" might be subtracted from the QP value for Y to yield the QP value for U, and "1" might be subtracted for the QP value for Y to yield the QP value for V. Any useful value of the amount to subtract can be used, limited only by a minimum value of "1" for the applied QP value.

This method works for constant QP values (variable bit rate). It also works as well for variable QP values (e.g., in both constant and variable bit rate motion compensated compression systems), since the instantaneous QP value can be biased by subtracting a specified difference value from the QP value for Y to yield a QP value for each of U and V.

Further, the range of these differential chroma-biased QP values can be extended using the extended QP range function or lookup, as described in the "High Precision Encoding and Decoding of Video Images" Patent Application referenced above.

It is necessary to signal the U and V bias values from the encoder to the decoder unless a pre-arranged value is used. These can be specified once, for example, for each session, group of pictures (GOP), frame, or image region.

Figure 2:
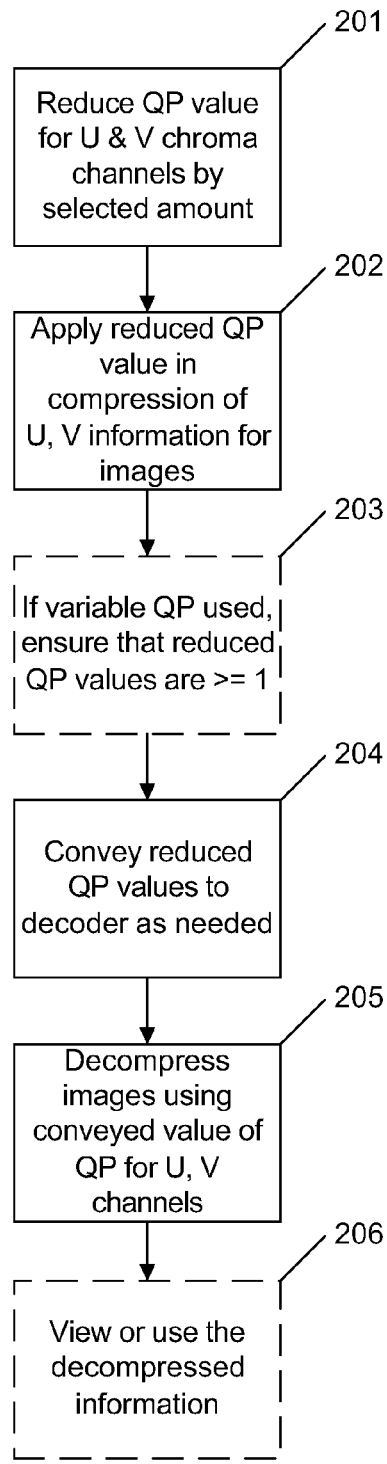
FIG. 2 is a flowchart showing an illustrative method (which may be computer implemented) for applying a QP bias for chroma channels.

FIG. 2 is a flowchart showing an illustrative method (which may be computer implemented) for applying a QP bias for chroma channels:

Step 201: In an image compression system, reduce the QP value for each of the U and V chroma channels by a selected value (which may be different for each channel).

Step 202: Utilize this reduced QP value for the U and V chroma channel compressions, respectively.

Step 203: Optionally, if variable QP values are used, ensure that the reduced U and V QP value is at least "1".

Step 204: Unless a pre-set bias is to be used, signal or convey the QP value reduction amount to the decoder as often as it may change (once at a minimum).

Step 205: Decompress (usually in a different computer) the signal using the appropriate QP value for U and V (again ensuring that the reduced QP value is at least "1").

Step 206: Optionally, view the decompressed images, or use the images for additional processing or analysis.

Another aspect of the invention is a technique useful when higher compression is required. In this aspect, a positive QP bias is applied to the QP value for the Y channel for use with either or both of the U and V chroma channels (preferably checking against a QP maximum value of a compression system, if any). Separate bias can be used for each of the U and V channels. Otherwise, the steps of such an embodiment would be similar to those shown in FIG. 2.

Logarithmic Coding of Luminance and Chroma

The paper entitled "The Use of Logarithmic and Density Units for Pixels," referenced above, describes the benefits of a logarithmic representation for dynamic range. Log representations of a matching dynamic range are somewhat similar to commonly used video transfer functions. Even though similar, the logarithmic representation is more optimal in extensibility, calibration usage, and in orthogonality of color channels than are the various commonly used video representations.

Another aspect of the invention is use of a logarithmic representation to benefit image coding. It has been discovered that logarithmic coding, when feasible, can improve coding efficiency for YUV color space representations of images originally represented as linear RGB pixel values (such as at the sensor of a camera). At other processing steps, a conversion to and from linear representations can be beneficial.

As described in the "High Precision Encoding and Decoding of Video Images" Patent Application referenced above, chroma crosstalk with luminance is minimized when:

$Y \log = \mathrm{Log}(Wr^*R + Wg^*G + Wb^*B)$ $U = \mathrm{Log}(R) - Y \log$ $V = \mathrm{Log}(B) - Y \log$ where Wr, Wg, and Wb are the linear weightings for the red, green, and blue components of luminance, and where R, G, and B represent a linear light space. These relationships are useful in applying this aspect of the invention.

Figure 3:
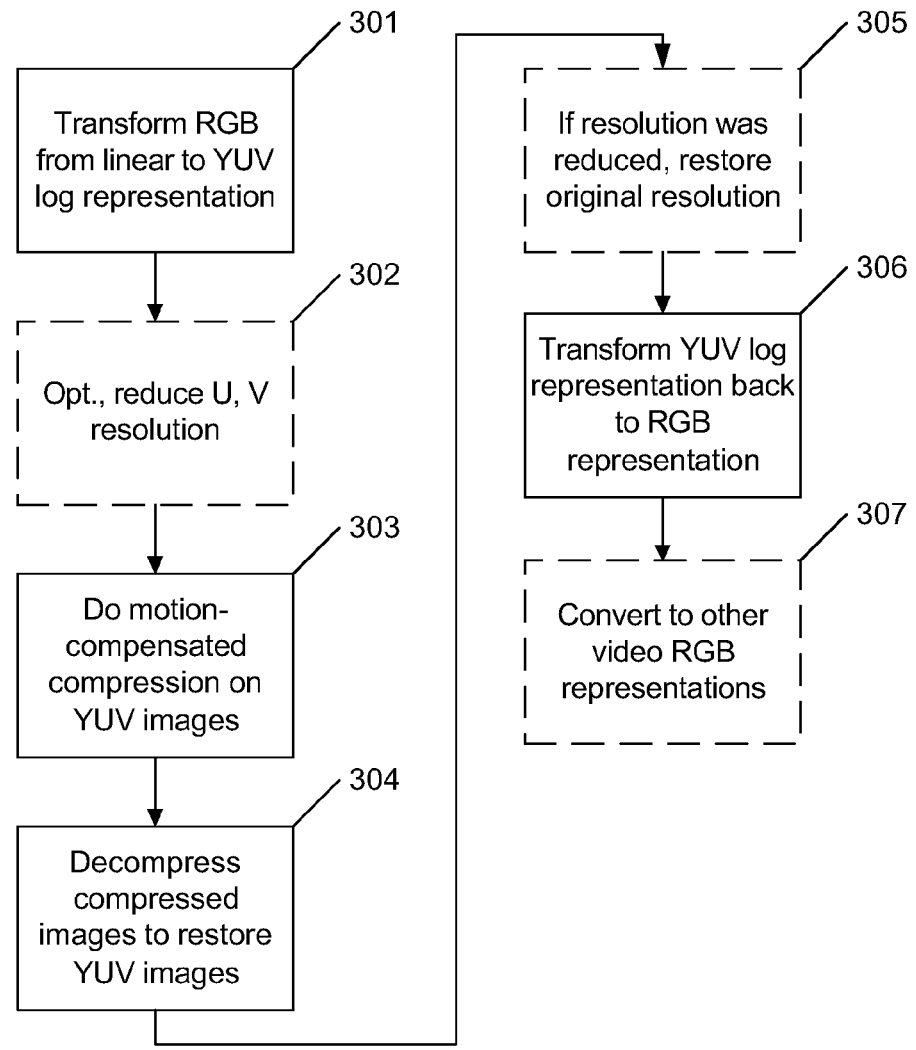
FIG. 3 is a flowchart showing an illustrative method (which may be computer implemented) for logarithmic coding of luminance and chroma information.

FIG. 3 is a flowchart showing an illustrative method (which may be computer implemented) for logarithmic coding of luminance and chroma information:

Step 301: In an image compression system, perform the following transformation on input (e.g., directly from a video camera) linear R, G, and B pixel values:

$Y \log = \mathrm{Log}(Wr^*R + Wg^*G + Wb^*B)$ $U = \mathrm{Log}(R) - Y \log$ $V = \mathrm{Log}(B) - Y \log$ where Wr, Wg, and Wb are the linear weightings for the red, green, and blue components of luminance.

Step 302: Optionally, reduce the resolution of the U and V chroma channels (as described above).

Step 303: Perform motion-compensated compression on this Y, U, and V representation of the moving image.

Step 304: Decompress the compressed images to restore Y, U, and V color components of the moving image (usually in a different computer).

Step 305: If optional Step 302 was applied, reverse the resolution reduction to restore full U and V resolution.

Step 306: Restore the linear R, G, and B pixel values using the following transformation:

$R = \mathrm{anti\text{-}log}(Y + U)$ $B = \mathrm{anti\text{-}log}(Y + V)$ $G = (\mathrm{anti\text{-}log}(Y) - Wr^*R - Wb^*B)/Wg$ Step 307: Optionally, convert to other video RGB representations (alternatively, may be done in lieu of Step 306 rather than in addition to Step 306).

Additional Chroma Axes

In extended dynamic range and extended contrast range images, it may be beneficial to augment visible wavelength channels with additional channels of image information, both visible and non-visible.

The range of colors available from any given set of red, green, and blue primaries does not include all possible visible colors. The combining of proportions of red, green, and blue primary colors to create other visible colors such as yellow, orange, cyan, and brown, is a property of the human visual system known as the "metamerism".

As pointed out in the paper entitled "An Example Representation for Image Color and Dynamic Range which is Scalable, Interoperable, and Extensible", referenced above, it is possible to add additional color primaries to the three primaries of red, green, and blue. In particular, cyan, magenta, and yellow color primaries help to extend the color gamut beyond the range available from most common red, green, and blue primary values. Further, violet and ultraviolet (which brightens phosphorescent colors) can also be conveyed.

Beyond the visible colors, invisible infrared wavelengths have proven useful in penetrating clouds and haze, and in seeing in the dark. Ultraviolet wavelengths can also be useful for seeing low-amplitude visible image details, such as fingerprints and surface coatings.

Further, even in the visible wavelengths, various materials (e.g., smog and underwater algae) often reduce the amount of contrast or dynamic range of some wavelengths. This is why smog can appear brown, giving a brown tint to all objects in the distance, having reduced the blue contrast and dynamic range. This is also why underwater photography can appear green, blue-green, or blue, since the red end of the visible spectrum is reduced in contrast and dynamic range.

The logarithmic relationships between Y, U, and V, as described above, will optimize the coding of color relationships for visible light.

In this aspect of the invention, additional chroma channels are added to the channels encoding three primary wavelengths, typically embodied by RGB or YUV representations. Further, when using a YUV color space, it is also possible to change the makeup of the Y (luminance) channel to favor the highest amplitude image signals. Thus, for example, the green visible channel might be coded using its own chroma channel, with luminance moving to other wavelength regions. This concept can be extended to where Y luminance is infrared, with red, green, and blue (and perhaps other visible and non-visible primaries) each having their own chroma channels.

In accordance with this aspect of the invention, for each new chroma channel, the following should be determined:

1) Should the channel be coded differentially from one or more other channels (usually from luminance, such as U=R−Y)?

2) Should the channel be given full resolution with respect to luminance, or can resolution be reduced without impairing the image quality for a given intended usage?

The determination in 1) is based upon the correlation of each coded channel with other channels. For example, ultraviolet or far-infrared wavelength images may be relatively uncorrelated to visible wavelengths, or to each other. In such a case, these channels might be coded without reference to other channels. However, any visible wavelengths are highly correlated, and thus can almost always benefit from being coded with respect to each other.

Based upon these determinations, a set of image channels can be selected, usually exceeding (or replacing and exceeding) the three primary channels (e.g., YUV). For example, the set of selected image channels may comprise a Y' luminance channel, and n chroma channels, such as a U' first chroma channel, a V' second chroma channel, and an X' third chroma channel.

Using this example, and applying motion compensated compression, the selected value of Y' would be coded with full resolution, and the various other chroma channels (U', V', X') would be differentially or independently coded. All channels can utilize the same motion vector and macroblock motion compensation structure as would be used for conventional YUV representations, except that there would be additional channels. Each such channel would utilize an appropriate resolution with respect to Y (as determined in step 2 above). In addition, a QP bias (as described above) can be independently applied to each chroma channel, to ensure that the desired compression chroma quality is achieved.

Even when applied only to visible wavelengths, additional chroma channels can ensure not only extended color range and more accurate color, but also allow additional clarity, detail, and noise fidelity to be applied to such highly visible colors as magenta, orange, yellow, and aqua-cyan. These benefits can be particularly significant for wide-dynamic range and wide-contrast range images.

Figure 4:
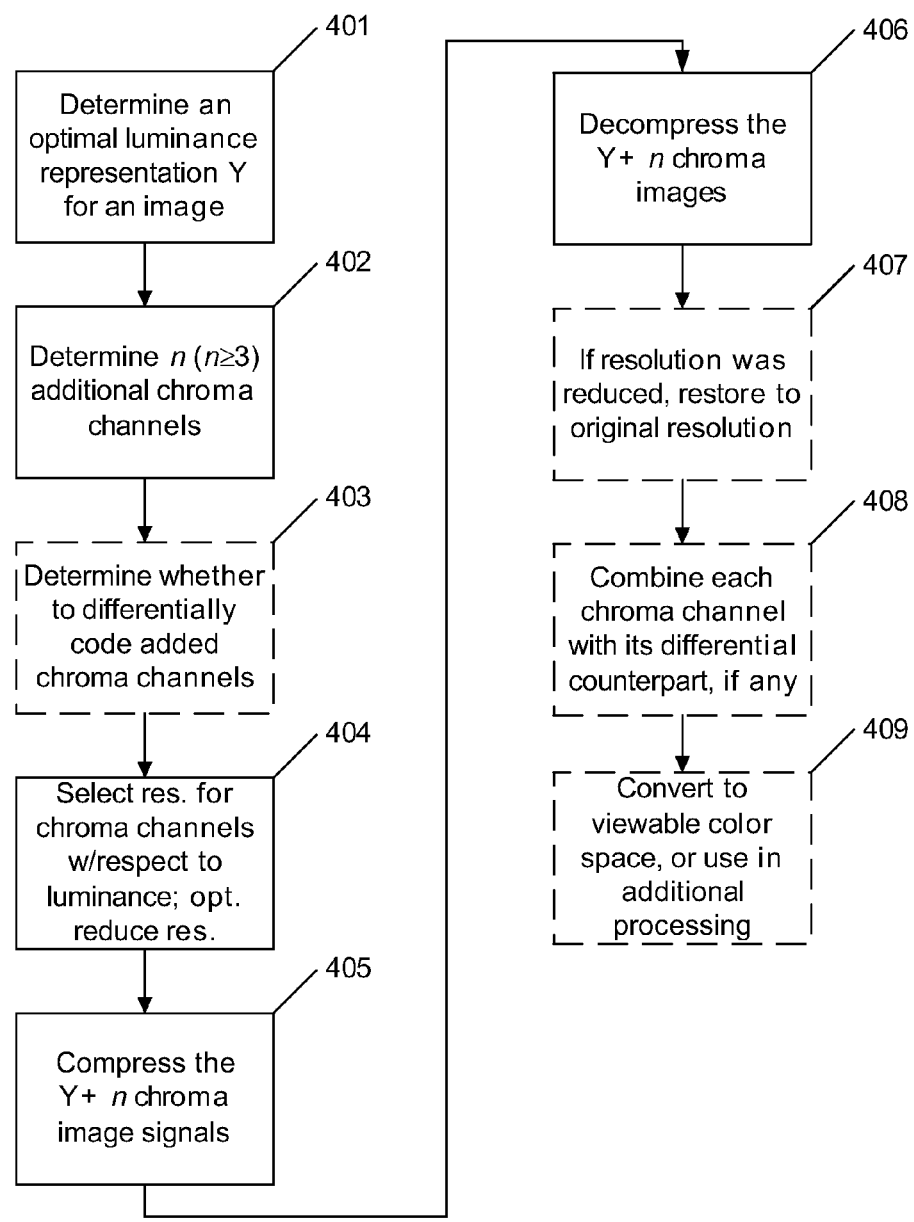
FIG. 4 is a flowchart showing an illustrative method (which may be computer implemented) for coding additional chroma channels in an image compression system.

FIG. 4 is a flowchart showing an illustrative method (which may be computer implemented) for coding additional chroma channels in an image compression system:

Step 401: In an image compression system, determine an optimal luminance representation for an image, selected based upon widest dynamic range and highest resolution, including optional non-visible wavelength image signals.

Step 402: Determine n additional chroma channels to represent the image, where n is at least three.

Step 403: Optionally, for each chroma channel, determine whether it is beneficial to code differentially with respect to luminance and/or one or more other chroma channels.

Step 404: Determine the resolution desired for each chroma channel image signal from an input with respect to the luminance image signal, such resolution being equal to or less than the resolution of the luminance, and optionally apply a resolution reduction.

Step 405: Compress the Y+n chroma image signals using motion compensated compression.

Step 406: Decompress the Y+n chroma images (usually in a different computer).

Step 407: If resolution reduction was applied, restore the original resolutions of the chroma channels.

Step 408: Combine each chroma channel with its differential counterpart, if any, from Step 403 above.

Step 409: Optionally, perform any of the following:

a) Convert the chroma channels to a viewing space, such as RGB, or to spaces having more than three primaries, and view as a true-color image;

b) Perform the conversion of a) but view as a false-color image (such as mapping infrared to green);

c) Use the chroma channels without conversion for processing and/or analysis.

As another option, each chroma channel may have a biased QP value applied (either increasing or decreasing), relative to the QP value used for the luminance channel, to achieve a desired level of quality for each chroma channel (i.e., trading off chroma noise versus higher degree of compression).

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A method for a decoder, the method comprising:
   receiving, at the decoder, at least a luminance QP (quantization parameter) value and a first chroma QP bias value, wherein the decoder comprises a luminance channel, a U chroma channel and a V chroma channel;
   utilizing, with the decoder, the luminance QP value and the first chroma QP bias value to determine a first chroma QP value for the U chroma channel by adding the first chroma QP bias value to the luminance QP value; and
   decompressing an image region of a video image using the luminance QP value and the first chroma QP value.

2. The method of claim 1,
   wherein the first chroma QP value is less than a predetermined maximum value, and
   wherein the first chroma QP value is greater than a predetermined minimum value.

3. The method of claim 1, further comprising:
receiving, at the decoder, a second chroma QP bias value;
utilizing, with the decoder, the luminance QP value and the second chroma QP bias value to determine a second chroma QP value for the V chroma channel by adding the second chroma QP bias value to the luminance QP value; and
decompressing the image region of the video image using at least the second chroma QP value.

4. The method of claim 3, wherein the first chroma QP bias value used to determine the first chroma QP value for the U chroma channel differs from the second chroma QP bias value used to determine the second chroma QP value for the V chroma channel.

5. The method of claim 4, further comprising configuring the first chroma QP bias value to be greater than zero or less than zero.

6. The method of claim 5, further comprising configuring the second chroma QP bias value to be greater than zero or less than zero.

7. The method of claim 1, further comprising configuring the QP bias value to be greater than zero or less than zero.

8. The method of claim 1, wherein the image region is inter-frame predicted.

9. The method of claim 1, further comprising:
utilizing, with the decoder, a range of differential chroma-biased QP values,
wherein the range of the differential chroma-biased QP values comprises the QP bias value.

10. The method of claim 9, further comprising:
extending the range of the differential chroma-biased QP values with an extended QP range function or a lookup table comprising the differential chroma-biased QP values.

11. The method of claim 10, wherein the lookup table comprises a non-linear lookup table.

12. The method of claim 10, wherein at least some of the differential chroma-biased QP values comprise regionally-varying QP values that vary over an image.

13. A video system comprising:
a decoder;
a data storage system;
a processor configured to interact with the data storage system and the decoder to execute instructions to:
receive, at the decoder, at least a luminance QP (quantization parameter) value and a first chroma QP bias value, wherein the decoder comprises a luminance channel, a U chroma channel and a V chroma channel;
utilize, with the decoder, the luminance QP value and the first chroma QP bias value to determine a first chroma QP value for the U chroma channel by adding the first chroma QP bias value to the luminance QP value; and
decompress an image region of a video image using the luminance QP value and the first chroma QP value.

14. A computer program, stored on a non-transitory computer-readable storage medium, for a video image system including a processor and a decoder that are configured to utilize quantization parameters for a color video image, the computer program comprising instructions to cause the processor in the video image system to execute instructions to:
receive, at a decoder, at least a luminance QP (quantization parameter) value and a first chroma QP bias value, wherein the decoder comprises a luminance channel, a U chroma channel and a V chroma channel;
utilize, with the decoder, the luminance QP value and the first chroma QP bias value to determine a first chroma QP value for the U chroma channel by adding the first chroma QP bias value to the luminance QP value; and
decompress an image region of a video image using the luminance QP value and the first chroma QP value.

15. The computer program of claim 14, further comprising instructions to cause the processor in the video image system to execute instructions to:
receive, at the decoder, a second chroma QP bias value;
utilize, with the decoder, the luminance QP value and the second chroma QP bias value to determine a second chroma QP value for the V chroma channel by adding the second chroma QP bias value to the luminance QP value; and
decompress the image region of the video image using at least the second chroma QP value.

16. The computer program of claim 15, further comprising instructions to cause the processor in the video image system to execute instructions to:
wherein the first chroma QP bias value used to determine the first chroma QP value for the U chroma channel differs from the second chroma QP bias value used to determine the second chroma QP value for the V chroma channel.

17. The computer program of claim 16, further comprising instructions to cause the processor in the video image system to execute instructions to configure the first chroma QP bias value to be greater than zero or less than zero.

18. The computer program of claim 17, further comprising instructions to cause the processor in the video image system to execute instructions to configure the second chroma QP bias value to be greater than zero or less than zero.

19. The computer program of claim 14, further comprising instructions to cause the processor in the video image system to execute instructions to utilize, with the decoder, a range of differential chroma-biased QP values,
wherein the range of the differential chroma-biased QP values comprises the QP bias value.

20. The computer program of claim 19, further comprising instructions to cause the processor in the video image system to execute instructions to:
extend the range of the differential chroma-biased QP values with an extended QP range function or a lookup table comprising the differential chroma-biased QP values.

21. A method for a decoder, the method comprising:
receiving, at the decoder, at least a luminance QP (quantization parameter) value and a first chroma QP bias value, wherein the decoder comprises a luminance channel, a red chroma channel and a blue chroma channel;
utilizing, with the decoder, the luminance QP value and the first chroma QP bias value to determine a first chroma QP value for the red chroma channel by adding the first chroma QP bias value to the luminance QP value; and
decompressing an image region of a video image using the luminance QP value and the first chroma QP value.

* * * * *